United States Patent
Miller et al.

(10) Patent No.: US 10,011,375 B1
(45) Date of Patent: Jul. 3, 2018

(54) SYSTEM AND METHOD FOR MICRO DOSING

(71) Applicant: E. & J. Gallo Winery, Modesto, CA (US)

(72) Inventors: Jeff Miller, Ripon, CA (US); Leland Fleming, Modesto, CA (US); Lewis Stern, Modesto, CA (US); Satish Puran, Modesto, CA (US); Richard Branscombe, Escalon, CA (US)

(73) Assignee: E&J Gallo Winery, Modesto, CA (US)

( * ) Notice: Subject to any disclaimer, the term of this patent is extended or adjusted under 35 U.S.C. 154(b) by 406 days.

(21) Appl. No.: 14/733,770

(22) Filed: Jun. 8, 2015

Related U.S. Application Data

(62) Division of application No. 13/594,675, filed on Aug. 24, 2012.

(51) Int. Cl.
*B67C 3/00* (2006.01)
*B65B 3/12* (2006.01)

(52) U.S. Cl.
CPC . *B65B 3/12* (2013.01); *B67C 3/00* (2013.01)

(58) Field of Classification Search
CPC .......................................................... B67C 3/00
USPC ..................................... 366/136, 137, 159.1
See application file for complete search history.

(56) References Cited

U.S. PATENT DOCUMENTS

| | | | |
|---|---|---|---|
| 2,724,581 A * | 11/1955 | Pahl et al. | B67C 3/22 222/135 |
| 2,915,023 A | 12/1959 | Rapaport | |
| 4,068,503 A | 1/1978 | Platt | |
| 4,804,796 A | 2/1989 | Wang et al. | |
| 5,200,220 A | 4/1993 | Capodieci | |
| 5,334,496 A | 8/1994 | Pond et al. | |
| 6,207,719 B1 | 3/2001 | Pardikes | |
| 6,280,075 B1 * | 8/2001 | Cadeo | B01F 3/08 366/132 |
| 6,544,109 B1 * | 4/2003 | Moore | B24B 37/04 451/285 |
| 8,513,408 B2 | 8/2013 | Yuan et al. | |
| 8,528,607 B2 * | 9/2013 | Wagner | B67C 3/007 141/290 |
| 2001/0042717 A1 | 11/2001 | Chioini et al. | |
| 2003/0190868 A1 * | 10/2003 | Palmgren | B24D 11/00 451/8 |
| 2005/0284102 A1 | 12/2005 | Herzog | |
| 2010/0224256 A1 * | 9/2010 | Tseng | B24B 37/04 137/2 |

FOREIGN PATENT DOCUMENTS

WO 2012/022375 A1 2/2012

* cited by examiner

*Primary Examiner* — David Sorkin
(74) *Attorney, Agent, or Firm* — Steptoe & Johnson LLP

(57) ABSTRACT

A system and method of micro dosing containers on a conveying system is disclosed. The system includes a supply tank to maintain suspended solids in a mixture; a dosing assembly to inject micro-doses of the mixture into bottles; a recirculation assembly to circulate the mixture from the supply tank to the dosing assembly and back to the supply tank; a power and controls operation assembly to supply the system with power, to provide the system with electromechanical control and/or to provide a user interface; and a stand to hold at least the supply tank, the portable dosing assembly, the recirculation assembly and/or the power and/or controls operation assembly.

15 Claims, 3 Drawing Sheets

SYSTEM AND METHOD FOR MICRO DOSING

CROSS REFERENCE TO RELATED APPLICATIONS

The present application is a divisional of U.S. application Ser. No. 13/594,675 entitled "SYSTEM AND METHOD FOR MICRO DOSING" filed on Aug. 24, 2012, which is hereby incorporated by reference.

FIELD OF TECHNOLOGY

The present disclosure relates in general to systems and methods for micro dosing.

BACKGROUND

One prior colorant is based on a natural silicate known as mica combined with titanium dioxide. This creates a range of colors with metallic sheen, from silver to gold. Titanium dioxide coated mica powder (herein referred to as "colored mica") is easy to apply and is widely used for various food applications (e.g., the coating of jelly beans, gums, the decoration of chocolate, biscuits, ice-cream and beverages). Colored mica can be mixed with various liquids to create a shiny and shimmering finish to the liquid. This gives the beverage a distinctive look and creates great consumer appeal visually. However, colored mica contaminates the beverage process and bottle filling equipment as it is extremely difficult or impossible to remove. There are various existing attempts at solutions to try and overcome this problem which will be discussed below. However, none of the existing attempts have proven satisfactory as all have disadvantages that render them unsatisfactory.

One prior attempt at a solution is to use dedicated production equipment for liquids requiring colored mica and separate equipment for liquids that do not require colored mica. This avoids cross-product contamination due to residual suspended solids from beverages with colored mica. However, this requires additional equipment at an economically unfeasible cost. This also greatly underutilizes the equipment for both processes.

Another prior approach requires aggressive, invasive and expensive cleaning of production equipment between products that require colored mica and those that do not. However, this adds to cost and time to disassemble, clean and/or replace components such as seals and gaskets in processing and bottle filling equipment that have been contaminated.

Some manufacturers add mixture modifiers such as gum or sugar to hold the solid particles in suspension for bottle filling. This may eliminate some of the difficulty of cleaning the equipment since residual solids would be prevented from settling in the equipment. However, the addition of solution modifiers creates sanitation issues due to potential pests and microbes and may also create a less temperature-stable mixture. Furthermore, there is an additional cost involved in cleaning and operational complexity in removing these modifiers from the equipment. Further, once material like colored mica is introduced into a filling system, it is virtually impossible to remove.

Another attempt at a solution is to use recirculating filling systems that maintain fluid velocities at all times to prevent colored mica from settling in the equipment. However, these systems are expensive. Additionally, these systems may stop unexpectedly (e.g., due to power losses) that leads to colored mica settling and contaminating the process equipment.

Therefore, there is a pressing need for a system and method for addition of materials that are difficult to clean and/or clear from a filling system. The present system and method solves these problems with a micro dosing system and method. One of the advantages of micro dosing is to avoid the contamination of a primary filling or supply system.

The foregoing examples of the related art and limitations related therewith are intended to be illustrative and not exclusive. Other limitations of the related art will become apparent to those of skill in the art upon a reading of the specification and a study of the drawings.

SUMMARY

The following aspects and embodiments thereof described and illustrated below are meant to be exemplary and illustrative, not limiting in scope.

A system and method of micro dosing is disclosed. The system and method is particularly useful with bottling and conveying systems. The system includes a supply tank designed to keep suspended solids in a homogenous mixture; a portable dosing assembly to inject micro-doses of the mixture into pre-filled bottles or containers; a recirculation assembly to circulate the mixture from the supply tank to the portable dosing assembly and back to the supply tank; a power and controls operation assembly to supply the system with power, to provide the system with electromechanical control and to provide a user interface; and a portable or fixed stand to hold the supply tank, the portable dosing assembly, the recirculation assembly and the power and controls operation assembly.

In one aspect, a micro-dosing system is contemplated. In a preferred embodiment, the micro dosing system is portable. In an embodiment, the system comprises a supply tank, a dosing assembly, a recirculation assembly, a power and/or control assembly, and a dosing stand. In an embodiment, the portable dosing assembly comprises a dosing pump to inject micro-doses of the micro dose blend into containers such as bottles pre-filled with a substance to which the micro dose is added.

In an embodiment, the recirculation assembly is fluidly coupled to the supply tank and the dosing assembly. In an embodiment, the recirculation assembly is configured to circulate the micro dose blend from the supply tank to the dosing assembly and/or back to the supply tank. In an embodiment, the recirculation assembly comprises a peristaltic pump for drawing the dose blend from the supply tank and pumping the dose blend to the dosing assembly. In an embodiment, the peristaltic pump comprises a variable-frequency drive motor for controlling the rotational speed of the peristaltic pump. In an embodiment, the recirculation assembly comprises an umbilical bundle for fluid and/or wiring transport.

In an embodiment, the power and/or control operation assembly is configured to supply the system with power, to provide the system with an electromechanical control, and/or to provide a user interface. In an embodiment, the power and controls operation assembly comprises a power supply. In an embodiment, the power and controls operation assembly comprises a compact logic programmable logic controller for providing the system with electromechanical control. In an embodiment, the power and controls operation assembly comprises a human-machine interface (HMI) control panel for providing a user interface. In one embodiment, the HMI control panel comprises an operating and monitoring screen for user-controlled operation and monitoring.

In an embodiment, the umbilical bundle comprises a dose supply tube fluidly coupled to the supply tank and the dosing assembly, for supplying the dose blend from the supply tank to the dosing assembly; a dose return tube fluidly coupled to the dosing assembly and the supply tank, for returning the mixture from the dosing assembly to the supply tank; and a bottle sensor cable for automating an electromechanical control of a bottle sensor photo eye.

In an embodiment, the dosing stand is configured to hold the supply tank, the dosing assembly, the recirculation assembly, and/or the power and controls operation assembly. In a further embodiment, the dosing stand is portable and comprises at least two wheels. In another embodiment, the dosing stand comprises at least two legs for securing the dosing stand in a working position. In yet another embodiment, the dosing stand comprises a hose rack for securing or holding an umbilical bundle, for example.

In an embodiment, the supply tank comprises an agitator for mixing and/or blending the micro dose blend. Preferably, the agitator keeps the micro dose blend in a suspension. In another embodiment, the agitator comprises a variable-frequency drive motor for controlling the rotational speed of the agitator. In a further embodiment, the supply tank comprises a hinged lid for access to the supply tank, e.g., for adding the dose blend and/or cleaning. In one embodiment, the hinged lid comprises at least three sealed ports comprising least three sealed ports comprising a discharge outlet, a return inlet, and a filtered vent.

In an embodiment, the dosing assembly comprises a mobile stand for holding pre-filled bottles or containers. In another embodiment, the dosing pump is positioned on a support stand coupled to the dosing stand. In a further embodiment, the dosing pump further comprises a servo controller to inject the correct or desired amount of micro dose blend into the pre-filled bottles by controlling the position and/or speed of the dosing pump. In yet another embodiment, the dosing assembly comprises a bottle sensor photo eye for detecting an opening of a pre-filled bottle.

In another aspect, a method for micro-dosing individual bottles or containers is contemplated. In an embodiment, the method comprises (i) mixing and/or blending a solid material in a liquid to form a homogenous suspension in a supply tank, (ii) circulating the suspension from the supply tank to a dosing assembly, (iii) injecting micro doses of the suspension into pre-filled bottles with a portable dosing, and (iv) circulating the suspension not injected back to the supply tank. In an embodiment, the method further comprises agitating the homogeneous suspension in the supply tank. In another embodiment, the method further comprises adjusting a flow of the suspension through the system to maintain the solid in suspension. In a further embodiment, the method comprises detecting the presence of an opening of the pre-filled bottle prior to injecting the micro doses into pre-filled bottles or containers.

The above and other preferred features, including various novel details of implementation and combination of events, will now be more particularly described with reference to the accompanying figures and pointed out in the claims. It will be understood that the particular system and methods described herein are shown by way of illustration only and not as limitations. As will be understood by those skilled in the art that the principles and features described herein may be employed in various and numerous embodiments without departing from the scope of the invention. As can be appreciated from the foregoing and following description, each and every feature described herein, and each and every combination of two or more of such features, is included within the scope of the present disclosure provided that the features included in such a combination are not mutually inconsistent. In addition, any feature or combination of features may be specifically excluded from any embodiment of the present invention.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

DETAILED DESCRIPTION

Figure 1:
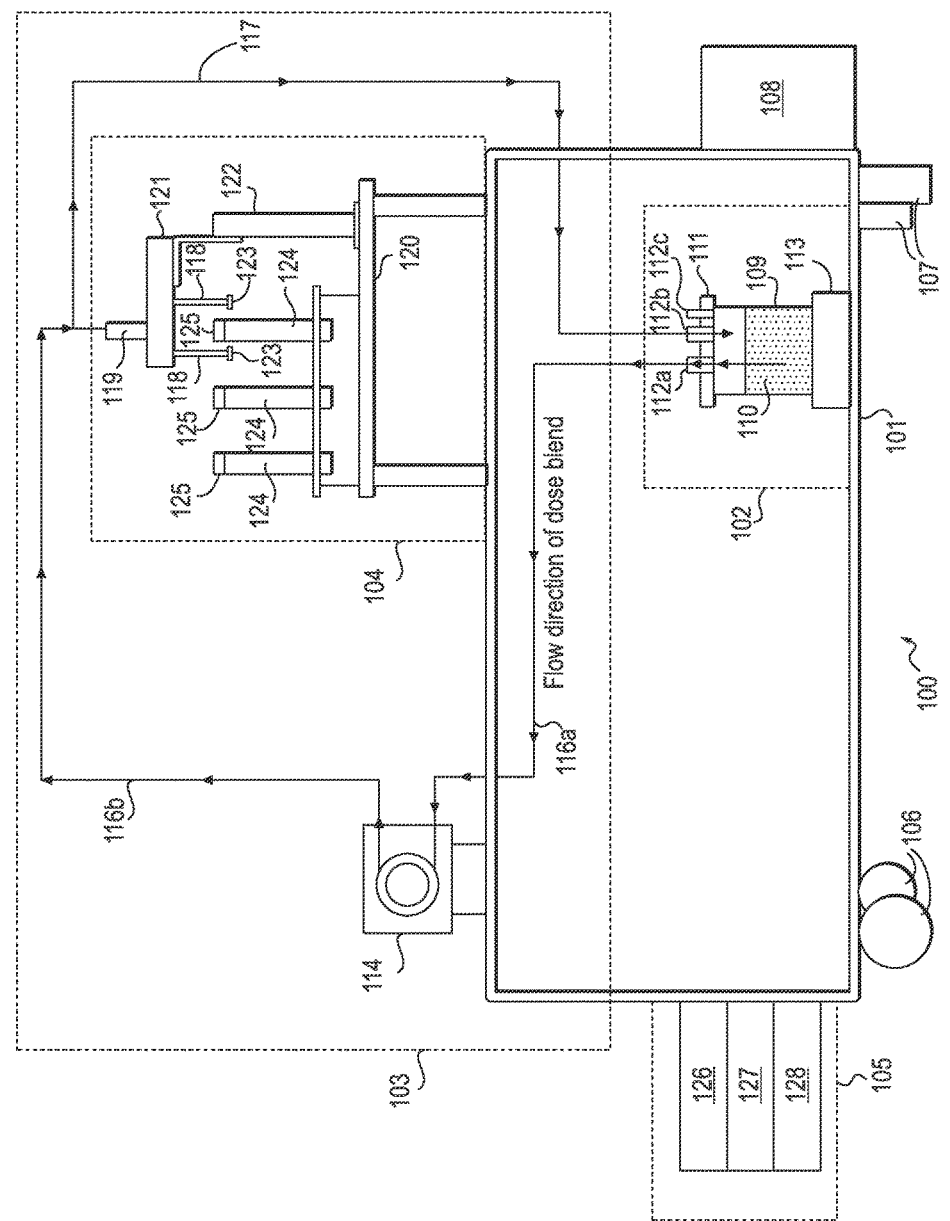
FIG. 1 illustrates a diagram of the micro bottle dosing system, according to one embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Measurements, sizes, amounts, etc., are often presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

FIG. 1 illustrates a diagram of the micro bottle dosing system 100, according to one embodiment. "Micro dosing" as used herein refers to the process of adding small quantities of a material to a system. In the context of a bottling system, micro dosing generally refers to addition of small quantities of a material during the bottling procedure. Typically, the micro dose is added to the container (e.g., a bottle) after the container is partially filled. The micro dose is typically a liquid or a mixture of liquid and solid. The system 100 generally interacts with a bottle conveying system. Typically, a dosing pump, such as a Hibar servo pump, and bottle sensor are positioned after a standard bottle filler, above a bottle transporting feed screw that is before the bottle closure machine (such as a cork inserter or screw capper). The dosing system includes a dosing stand 101, a mixing-blending-supply tank system 102, a recirculation system 103, a dosing assembly system 104, and a power controls operation system 105. The dosing stand 101 may be a stainless steel stand that is eighteen inches wide with a depth of eighteen inches and a height of sixty inches, according to one embodiment. It will be appreciated that the dosing stand 101 may be formed of any suitable material such as, but not limited to, metals and plastics. Suitable metals include, but are not limited to stainless steel, carbon steel or other steel alloys, and titanium. It will be appreciated that the dosing stand may be fabricated of more than one material. It will be further appreciated that the dosing stand 101 may be any size and shape suitable for interacting with a bottle conveying system as known in the art. Preferably, the stand is portable so that it may be used with alternate bottle conveying systems and/or at alternate sites. In this embodiment, the base of the dosing stand 101 includes at least two wheels 106 for tilting and rolling the dosing system 100 and two legs 107 for securing the stand in the working position. It will be appreciated that the dosing stand 101 may further be positioned on three, four or more wheels for portability. Where the dosing stand 101 includes three or more wheels, it will be appreciated that the stand may not include separate legs. The dosing stand 101 may further include one or more devices to lock the stand in the working position such as, but not limited to, one or more wheel locks. In another embodiment, the dosing stand 101 is compact to aid portability and/or for ease in interacting with the bottle conveying system. The dosing stand 101 may also include at least one hose rack 108 for supporting an umbilical bundle. The umbilical bundle is used for transporting the dose blend 110 and/or for electrical wiring purposes. The umbilical bundle may be any suitable length including, but not limited to, about ten to thirty feet, according to one embodiment. The fluid transport portion of the umbilical bundle comprises fluid connectors to connect the supply tank system 102 to the recirculation system 103, the recirculation system 103 to the dosing assembly 104, and the dosing assembly 104 to the supply system 102. It will be appreciated that the umbilical bundle may not be contiguous, but instead comprise parts for connecting the separate assemblies/systems.

The mixing-blending-supply tank system 102 includes a supply tank 109 filled with a dose blend 110, a lid 111, at least two sealed ports 112a, 112b, and a filtered vent 112c. In one embodiment, the lid 111 is hinged. The supply tank 109 may be any suitable size required for holding a suitable amount of the dose blend. In embodiments, the supply tank is about a 0.1-25 gallon supply tank. The supply tank is a 10 gallon supply tank, according to one specific, but non-limiting, embodiment. In other embodiments, the supply tank holds about 1-20, about 2-20, about 5-20, about 1-5, about 1-10, about 5-10, about 10-15, or about 10-20 gallons. Suitable supply tanks may be fabricated by Laciny Bros, Inc. (St. Louis, Mo.) or JVNW, Inc. (Canby, Oreg.).

In one non-limiting embodiment, the dose blend 110 is a homogenous suspension of the dose material in a suitable liquid phase. In one non-limiting embodiment, the dose blend 110 comprises colored mica particles in a mixture of alcohol, water and/or citric acid. It will be appreciated that the dose blend 110 may be a suspension of other suspended solids in a mixture of other liquids, according to other embodiments. The dose blend may comprise any liquid or material that would require cleaning between use of a filling system. In particular, the dose blend may be any liquid or material that requires extensive or excessive cleaning to remove the material from a filling system before using the system with a further material. In other embodiments, the dose blend may be any liquid or material that would contaminate a further material used in the filling system. The system will be described hereafter with regard to a suspension of colored mica although it will be appreciated that the description is applicable to any suitable dose blend.

In an embodiment, the supply tank 109 includes a removable and/or hinged lid 111 for adding materials and/or cleaning. The lid 111 further includes at least two sealed ports 112a and 112b for the discharge and return of the dose blend and a filtered inlet 112c to atmosphere or inert gas 110. It will be appreciated that the sealed ports 112a, 112b and/or filtered inlet 112c may be positioned in the supply tank 109 as well as in the lid 111. The supply tank 109 preferably includes an agitator 113. In one embodiment, the agitator 113 has a variable-speed motor (such as an AC-VFD or DC with speed controller) to provide the various speeds preferred for mixing ingredients and/or maintaining a homogenous mixture for extended times and/or for cleaning the system. It will be appreciated that any suitable agitator and/or variable speed motor may be included as part of the tank design and manufacture. In embodiments, the agitator may be one as manufactured by Laciny or JVNW. The VFD motor controls the rotational speed of an alternating current (AC) electric motor by controlling the frequency of the electrical power supplied to the motor. This keeps the dose blend 110 in motion by shaking and/or stirring the supply tank 109 so that the colored mica powder will be continuously and/or homogenously suspended in the dose blend 110. The agitator 113 may include any motor system that maintains the colored mica particles suspended in the dose blend 110.

The recirculation assembly 103 includes a pump 114, such as a peristaltic pump, preferably with a variable speed controlled motor. Suitable pumps are available from Watson-Marlow Pumps. A flow assembly may maintain the mixture flow in such a way that the heavy mica particles are kept in suspension with a sufficient mixture velocity. Higher mixture velocity prevents the particles from settling. Sufficient mixture supply pressure is required to the dosing pump infeed to provide consistent dose volumes in each bottle. This is accomplished with designed maximum clearances and minimum flow velocities to direct, regulate and control, and/or maintain the homogenous mixture flow from the supply tank to the portable dosing assembly and back to the supply tank. The hose rack 108 holds at least a portion of the umbilical bundle, according to one embodiment. The umbilical bundle typically includes two sections of dose supply tubes or hoses 116*a* and 116*b*, a dose return tube or hose 117, and a bottle sensor cable 118. The dose supply tube 116*b* is connected to the dosing pump 121 by any suitable means including, but not limited to, a feed screw 119. In another embodiment, the dose supply tube 116*b* is connected to the dosing pump via an assembly of parts 119. Any suitable connection(s) between the second section of the dose supply tube 116*b* and the dosing pump 121 are contemplated. One exemplary connection assembly is shown in FIG. 3. The first section of the dose supply tube 116*a* transports the dose blend 110 from the supply tank 109 to the peristaltic pump 114 and the second section of the dose supply tube 116*b* transports the dose blend 110 from the peristaltic pump 114 to the dosing pump 121. The peristaltic pump 114 draws the dose blend 110 from the supply tank 109 through the first section of the dose supply tube 116*a* and pumps it through the second section of the dose supply tube 116*b* in the direction toward the dosing pump 121 as shown in the flow direction of the dose blend 110 in FIG. 1, according to one embodiment. The peristaltic pump 114 includes a circular pump casing with a rotor. The rotor includes a number of rollers which are attached to the external circumference to relax and compress the flexible tube in the pump casing. When the flexible tube relaxes, the dose blend 110 is drawn from the supply tank 109 through the first section of the dose supply tube 116*a* and moves to the peristaltic pump 114. When the rotor turns, a portion of the flexible tube compresses and closes to push the dose blend 110 out of the peristaltic pump 114 through the second section of the dose supply tube 116*b* in the direction towards the dosing pump 121. The pump 114 may be used to direct, regulate and/or control the flow of the dose blend 110 from the supply tank 109 to the dosing pump 121 and back to the supply tank 109. The recirculation system 103 may make use of plug-in fittings that require no tools, according to one embodiment.

Figure 3:
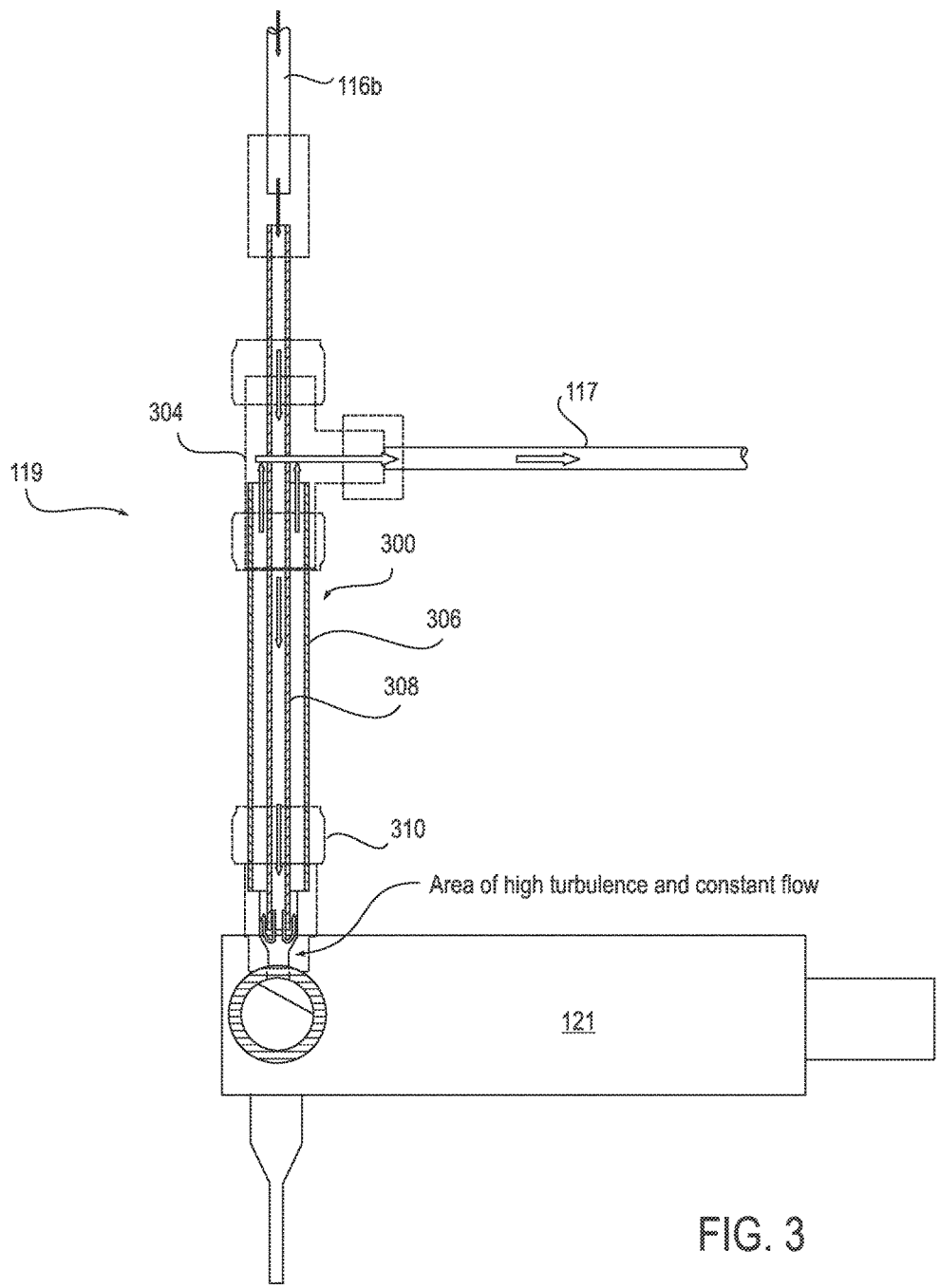
FIG. 3 is a diagram of an exemplary connection assembly for connecting/coupling the supply tube to the dosing pump.

As noted above, the dose supply tube 116*b* may be operatively and/or fluidly connected or coupled to the dosing pump 121 by any suitable coupling or connector. An exemplary connection assembly is shown in FIG. 3. It will be appreciated that this connection assembly is for illustrative purposes only and is not limiting. The dose supply tube 116*b* is connected to the proximal end of a flow tube 300 by a straight fitting 302. In an embodiment, the flow tube 300 comprises an inner flow tube 308 for flow of the dose supply to the dosing pump and an outer flow tube 306 that at least partially covers the inner flow tube 308. An exemplary inner flow tube 308 is a ¼" stainless steel tube and an exemplary outer flow tube 306 is ½" stainless steel tube. It will be appreciated that any suitable size tube may be used for the inner and outer flow tubes. Preferably, the outer flow tube 306 has a circumference that is larger than the inner flow tube 308 to allow flow of the dose blend between the tubes. It will further be appreciated that any suitable material may be used for the inner and outer flow tubes as well as the connectors including, but not limited to carbon steel or other steel alloys, stainless steel, galvanized steel, copper, polyvinyl chloride (PVC) or other polymers. The flow tube 300 is further connected or coupled to the product return tube 117. In an exemplary embodiment, the flow tube 300 is connected or coupled to the product return tube 117 by a T-fitting. An exemplary T-fitting is a heat exchanger T-fitting. The distal end of the flow tube 300 is connected or coupled to the dosing pump 121 through a suitable connector or plug 310. This configuration allows the dose blend to flow into the dosing pump 121 or back to the dose blend supply tank 109. If a bottle is positioned for filling from the dosing pump 121, the dose blend flows from the product supply tube 116*b* through the inner flow tube 308 and into the dosing pump 121. If a bottle is not positioned, or not properly positioned, the dose blend may flow from the product supply tube 116*b* through the inner flow tube 308, into the outer flow tube 306 and to the product return tube 117. The area at the distal end of the inner flow tube 308 is generally an area of high turbulence and constant flow.

The portable dosing assembly 104 preferably includes a mobile stand 120 and a dosing pump 121 fixed on a filler-closure support stand 122. In one embodiment, the mobile stand moves the pre-filled bottles 124 towards the dosing pump 121 after they convey from a filling machine. The dosing system 121 includes a bottle sensor cable 118 and powers a bottle sensor 123 such as a photo eye. One suitable sensor is available from Allen-Bradley. The sensor 123 detects the presence of a bottle opening 125 before the dosing pump 121 injects micro-doses of the dose blend 110 as an existing conveying system advances a pre-filled bottle 124. The pre-filled bottles 124 may be filled to nearly 100% (e.g., 99.5% full), according to one embodiment. It will be appreciated that the bottle may be filled more or less depending on the size of the container and/or the amount of dose blend added. According to one embodiment, the dosing pump 121 may make use of a servo controller that uses error-sensing negative feedback to correct and control the position, speed and/or other parameters so that the correct amount of micro-doses are injected into the bottles 124 (such as with the Hibar P series metering pump). It will be appreciated that any volume of micro-dose may be injected depending on the material injected. As an example, the Hibar P series pump is capable of dispensing 0 ml to about 20 ml. It will further be appreciated that the speed of the conveyer will affect the maximum dose size. A conveyer with a lower speed allows for a larger dose while a conveyer with a higher speed allows for a smaller dose. In non-limiting embodiments, the micro dose comprises about 0.1-5 ml of the dose blend. In further embodiments, the micro dose comprises about 0.5-1 ml, about 0.5-5 ml, or about 1-5 ml of the dose blend. The dosed bottles are conveyed via a feed screw to the closure machine (such as a corker or capper).

The power controls operation assembly 105 includes a power supply 126, a compact logics programmable logic controller (PLC) 127, and/or a human-machine interface (HMI) control panel 128 with an operating and monitoring screen, according to one embodiment. One suitable PLC and HMI control panel may be obtained from Allen Bradley. The power controls operation assembly 105 provides the dosing system 100 with power, electromechanical control and/or a user interface. The PLC 127 provides electromechanical control of the bottle sensor 123 and dosing pump 121 on the assembly line and is generally immune to electronic noise and resistant to vibration and impact. The HMI control panel 128 provides a user interface between the user and the dosing system 100 for controlled operation and monitoring.

Figure 2:
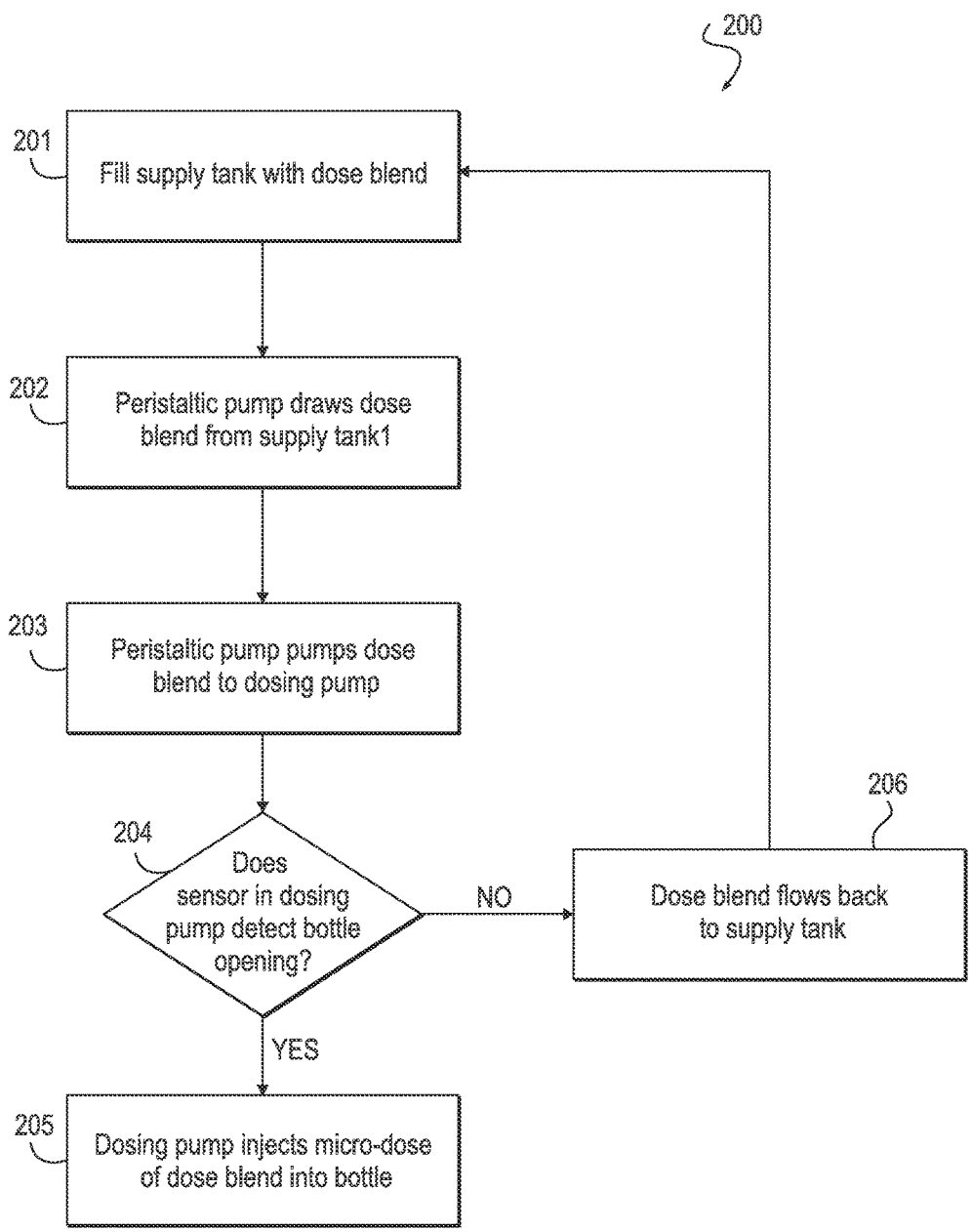
FIG. 2 illustrates an exemplary process for micro-dosing individual bottles of the present system, according to one embodiment.

FIG. 2 further illustrates an exemplary process for micro-dosing individual bottles of the present system, according to one embodiment. A process for micro-dosing individual bottles 200 begins with filling the supply tank with dose blend 201. In one embodiment, the supply tank is filled manually, via measuring implements from bulk drums, buckets, bags and/or tot bins. The peristaltic pump draws the dose blend from the supply tank 202 through the dose supply tube and delivers it to the dosing pump 203. Hence, the dosing pump is filled continuously with the dose blend from the supply tank through a connector 119 such as a uniquely designed group of fittings. After the pre-filled bottles convey through a filling machine, the sensor, which is attached to the dosing pump, determines if a bottle opening is detected 204. If the sensor detects the presence of a bottle opening 204, the dosing pump injects a micro-dose of colored mica into the bottle 205. If a bottle opening is not detected, the dose blend flows through the dose return tube back to the supply tank 206 where the process 200 is repeated. This ensures that there is a continuous flow of the homogenous dose blend from the supply tank to the dosing pump so that the dosing pump injects a micro-dose of dose blend into each individual pre-filled bottle whenever the sensor detects a bottle opening.

The example embodiments have been described herein above regarding the maintaining of suspended colored mica particles in a mixture in a batching mixing-blending-supply tank, supplying the colored mica mixture via a pumped, agitated recirculation system to a dosing pump, which is used to inject micro doses into moving pre-filled bottles after they convey from a filling machine and prior to bottle closure. Various modifications to and departures from the disclosed example embodiments will occur to those having ordinary skill in the art. For example, mixtures with other suspended solids can be supplied to a dosing pump via a pumped, agitated recirculation system.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

We claim:

1. A method, comprising:
   mixing a solid material in a liquid to form a homogenous suspension in a supply tank;
   circulating the homogenous suspension from the supply tank to a dosing pump;
   injecting a desired amount of a micro-dose of the homogenous suspension into a pre-filled vessel with the dosing pump;
   detecting a desired position of an opening of the pre-filled vessel prior to injecting the micro-dose of the homogenous suspension into the pre-filled vessel; and
   circulating the homogenous suspension that is not injected back to the supply tank.

2. The method of claim 1, further comprising agitating the homogenous suspension in the supply tank.

3. The method of claim 2, further comprising controlling a rotational speed of an agitator for agitating the homogenous suspension in the supply tank.

4. The method of claim 1, wherein circulating the homogenous suspension from the supply tank to the dosing pump further comprises adjusting a flow of the homogenous suspension to maintain the solid material in suspension with a desired flow velocity.

5. The method of claim 1, further comprising circulating the homogenous suspension from the supply tank to the dosing pump using a peristaltic pump.

6. The method of claim 1, further comprising detecting the desired position of an opening of the pre-filled vessel using a sensor.

7. The method of claim 1, further comprising injecting the desired amount of the micro-dose of the homogenous suspension through a first flow tube to the pre-filled vessel based on detecting the opening of the pre-filled vessel at the desired position.

8. The method of claim 7, further comprising circulating the homogenous suspension that is not injected through a second flow tube to the supply tank based on detecting the opening of the pre-filled vessel at an undesired position, wherein the second flow tube at least partially covers the first flow tube, and wherein the second flow tube has a larger circumference than the first flow tube.

9. The method of claim 1, wherein injecting the desired amount of the micro-dose of the homogenous suspension into the pre-filled vessel with the dosing pump is based on controlling one or more of a position and a speed of the dosing pump.

10. The method of claim 9, wherein controlling the one or more of the position and the speed of the dosing pump is based on error-sensing negative feedback.

11. The method of claim 1, further comprising providing a power supply to a power and control operation assembly for controlling one or more of:
    mixing the solid material in the liquid to form the homogenous suspension in the supply tank;
    circulating the homogenous suspension from the supply tank to the dosing pump;
    injecting the desired amount of the micro-dose of the homogenous suspension into the pre-filled vessel with the dosing pump; and
    circulating the homogenous suspension that is not injected back to the supply tank.

12. The method of claim 11, further comprising providing a user interface to the power and control operation assembly.

13. The method of claim 1, wherein the solid material includes mica.

14. The method of claim 13, wherein the solid material further includes titanium dioxide.

15. The method of claim 1, wherein the liquid includes one or more of alcohol, water, and citric acid.

* * * * *